(12) United States Patent
Schatzmann et al.

(10) Patent No.: US 10,375,045 B2
(45) Date of Patent: Aug. 6, 2019

(54) METHODS AND SYSTEMS FOR ONBOARDING NETWORK EQUIPMENT

(71) Applicant: Swisscom AG, Bern (CH)

(72) Inventors: Dominik Schatzmann, Bremgarten (CH); Markus Brunner, Sursee (CH)

(73) Assignee: SWISSCOM AG, Bern (CH)

( * ) Notice: Subject to any disclaimer, the term of this patent is extended or adjusted under 35 U.S.C. 154(b) by 0 days.

(21) Appl. No.: 14/743,710

(22) Filed: Jun. 18, 2015

(65) Prior Publication Data
US 2015/0373001 A1 Dec. 24, 2015

(30) Foreign Application Priority Data

Jun. 18, 2014 (EP) .................................. 14173002

(51) Int. Cl.
*H04L 29/06* (2006.01)
*H04L 12/24* (2006.01)
(52) U.S. Cl.
CPC .......... *H04L 63/08* (2013.01); *H04L 41/0803* (2013.01); *H04L 41/0816* (2013.01); *H04L 41/28* (2013.01); *H04L 63/0876* (2013.01)
(58) Field of Classification Search
CPC .. H04L 41/0803; H04L 63/0876; H04L 41/28
See application file for complete search history.

(56) References Cited

U.S. PATENT DOCUMENTS

| | | | |
|---|---|---|---|
| 7,024,548 B1 | 4/2006 | O'Toole, Jr. | |
| 2003/0018889 A1* | 1/2003 | Burnett | H04L 41/0809 713/153 |
| 2004/0059813 A1* | 3/2004 | Bolder | H04L 41/0859 709/224 |
| 2004/0258074 A1* | 12/2004 | Williams | H04L 29/12216 370/395.5 |
| 2005/0234931 A1* | 10/2005 | Yip | H04L 41/0816 |
| 2006/0047784 A1* | 3/2006 | Li | H04L 41/046 709/220 |
| 2006/0185001 A1 | 8/2006 | Stieglitz et al. | |

(Continued)

OTHER PUBLICATIONS

European Search Report dated Nov. 20, 2014 for European Application No. EP14173002.

*Primary Examiner* — Teshome Hailu
(74) *Attorney, Agent, or Firm* — McAndrews, Held & Malloy, Ltd.

(57) ABSTRACT

Methods are systems are provided for onboarding network equipment to managed networks. An onboarding controller may be used in authenticating the to-be-onboarded network equipment. The onboarding controller may issue a challenge, which may comprise instructions for making configuration changes to the network equipment. The configuration changes may comprise adding, removing, and/or changing connections within and/or to the network equipment within a local network comprising the network equipment. The onboarding controller may determine whether or not the configuration changes have been made to the network equipment. The determination of configuration changes may be used in verifying the identity and/or location of the network equipment, and/or in determining determine to which managed network the network equipment should be onboarded.

18 Claims, 3 Drawing Sheets

(56) References Cited

U.S. PATENT DOCUMENTS

| | | | |
|---|---|---|---|
| 2008/0215668 A1* | 9/2008 | Hu | H04L 41/0806 709/202 |
| 2010/0249951 A1* | 9/2010 | Klug | G05B 19/0423 700/3 |
| 2013/0254879 A1* | 9/2013 | Chesla | H04L 63/1458 726/22 |
| 2013/0322504 A1* | 12/2013 | Asati | H04L 41/0853 375/224 |
| 2014/0282902 A1* | 9/2014 | Zou | H04L 63/08 726/4 |
| 2015/0121470 A1* | 4/2015 | Rongo | H04L 41/0813 726/4 |

* cited by examiner

METHODS AND SYSTEMS FOR ONBOARDING NETWORK EQUIPMENT

CLAIM OF PRIORITY

Pursuant to 35 U.S.C. § 119, this patent application claims the filing date benefit of, and right of priority to European (EP) Patent Application No. EP14173002.8, filed Jun. 18, 2014. The above application is hereby incorporated herein by reference in its entirety.

FIELD

The present disclosure relates to networking. In particular, various embodiments in accordance with the present disclosure relate to systems and methods for onboarding new network equipment.

BACKGROUND

Conventional methods and systems for onboarding network equipment can be costly, cumbersome and inefficient. In this regard, the term "onboarding" refers to the process of registering new network equipment to a managed network. Existing solutions, however, for onboarding network equipment (e.g., supporting or providing the required verification and/or authentication) may have various notable shortcomings and/or issues.

Further limitations and disadvantages of conventional and traditional approaches will become apparent to one of skill in the art, through comparison of such approaches with some aspects of the present disclosure as set forth in the remainder of the present application with reference to the drawings.

BRIEF SUMMARY OF THE DISCLOSURE

System and/or methods are provided for onboarding network equipment, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

BRIEF DESCRIPTION OF THE DRAWINGS

Various features and advantages of the disclosure will become apparent from the following description of non-limiting example implementations, with reference to the appended drawings, in which.

DETAILED DESCRIPTION OF THE DISCLOSURE

As utilized herein the terms "circuits" and "circuitry" refer to physical electronic components (e.g., hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set {(x), (y), (x, y)}. In other words, "x and/or y" means "one or both of x and y." As another example, "x, y, and/or z" means any element of the seven-element set {(x), (y), (z), (x, y), (x, z), (y, z), (x, y, z)}. In other words, "x, y and/or z" means "one or more of x, y, and z." As utilized herein, the term "exemplary" means serving as a non-limiting example, instance, or illustration. As utilized herein, the terms "for example" and "e.g." set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.).

Certain implementations of the present disclosure may be found in systems and methods for onboarding network equipment, such as in managed networks, as described in the following in more detail below with reference to the attached figures.

In this regard, today's network architectures may be dynamically manageable, configurable and adaptable, such as to support high-bandwidth, dynamic nature of cloud-based and software-as-a-service (SaaS) applications. The trend towards software-defined networking (SDN), for example, may allow network control functions to be decoupled from packet-forwarding functions, thereby enabling the network itself to be programmable, and allowing the underlying infrastructure to be abstracted for applications and network services. Thus, managed networks may be typically private networks implemented over a public network. Network-wide traffic-flow can be administered and managed dynamically in order to respond to rapidly-evolving network requirements. In such agile and configurable network environments, network equipment may be required, such as to provide any significant level of autonomous network management functionality as would have been found in earlier networking arrangements (e.g., in which a switch, for example, may comprise its own layer 2 or layer 3 functionality).

Network equipment and network management systems may typically run in the same network. In the case of a secured management network, the security of the devices may rely on being part of this network. Other possible security arrangements may require adding security measures—e.g., a digital security key, hardware tokens such as trusted platform modules (TPMs), or credentials for creating an authenticated channel to the management system. In fully-managed networks, network security may rely on having complete knowledge and/or control of each physical device and its connection(s). In some instances, new network equipment may be added and may need to be onboarded. When new network equipment is to be onboarded, certain actions may need to be taken to ensure (or allow) the onboarding. For example, in managed networks the management system may seek out and verify the identity and/or authenticity of the new network equipment. Once the new network equipment is successfully onboarded to the managed network, it becomes part of the managed network's infrastructure. If the network management system is owned by a single entity, then the question of ownership or control of the various network equipment entities may not be pertinent, and a decision as to which entity a device belongs is not normally required.

As noted, existing solutions for onboarding network equipment, particularly in managed networks, may have certain shortcomings and/or issues. For example, in some existing solutions, a network supplicant's equipment may be authenticated using a particular port ID or MAC address of the device as authentication information in order to authenticate the device to an authentication server. However, such solutions require foreknowledge of the port ID and MAC address of the equipment, and further are open to abuse by emulation or faking of these device parameters.

In some existing solutions, an authentication protocol may be used to configure a network device such that, once configured with the authentication protocol, a user of the network device may then be able to use the new authentication protocol to gain access to the network. The configuration of the network device changes the network device so that authentication can take place. In such solutions, the term "authentication" refers to a protocol or sequence of actions for authorizing the establishment of a communications session between the network devices and the network. However, information about the identity or the location of the network device is not required in order for the communications session to be authorized. By contrast, when used in conjunction with various implementations in accordance with the present disclosure, the term "authentication" may refer to a process of verifying the identity and/or location of a network device.

Existing onboarding arrangements may typically be unsuitable for use over unsecured or public networks such as the Internet, or they may require the network equipment to be authenticated, e.g., by a user connecting a laptop or PC to the network equipment, logging into the device with security parameters or software in the device. Alternatively, a hardware enrollment process may be needed, for example using an additional SIM card in the network equipment for authenticating the device. Further, existing solutions may also oblige the network manager to provide network equipment hardware which is pre-configured for the particular network environment, thereby restricting the number of potential users to those who are willing or able to use such pre-configured network equipment.

Therefore, existing onboarding arrangements and/or solutions require dedicated hardware, firmware or software, and may involve complex, inflexible systems for coordinating network management tasks and for communicating authentication information around the network in order for them to function effectively. In addition, existing onboarding arrangements may not be suitable for onboarding "dumb" network equipment such as network switches, which may only be able to identify themselves passively (e.g., by a MAC address), and which may not be equipped with hardware or software for engaging in an onboarding process with a remote authentication controller of a managed network.

Accordingly, various implementations in accordance with the present disclosure may overcome at least some of the disadvantages of existing methods and systems. To this end, new networking devices may be authenticated during onboarding attempts in an improved and enhanced manner. For example, by issuing a challenge, specifying a network configuration change to be made to the network equipment, and then detecting whether the network equipment has been configured as specified in the challenge, the onboarding process can be carried out without any special hardware or software at the network equipment being onboarded, and without any pre-configuration of the network equipment which is being onboarded. In other words, the onboarding may be selectively done based on issuing of the challenge that includes carrying on a particular change, and then determining an outcome of the challenge (e.g., whether the change was made, and/or how it was carried out). The network equipment may thus be any standard device; no special pre-provisioning is required, nor is any special equipment required, such as a connected laptop.

Further, the onboarding process may be made invisible to other devices on the network. The challenge/configuration of the network device may conceivably be detectable by a snooping device (if it knows where to look); however the significance of the network configuration of the network equipment (particularly if it includes a timed sequence of configuration steps) would be meaningless to any device except the onboarding controller.

In the context of this description, references to devices should not be taken as an indication of any particular kind of physical structure. A device or network element (or network equipment) may comprise discrete but interconnected modules, for example, or may be implemented partially or entirely as software or firmware running on a computer or dedicated electronic device, or embedded on a data carrier or integrated circuit. Similarly, references to connections should not be taken as implying any particular kind of physical connections. Unless otherwise specified, a connection may be understood to comprise any wired, optical, wireless or other known means of transferring information between communicating devices. Further, it should be noted that as used hereafter, the terms "authentication controller" and "onboarding controller" may be used interchangeably; the terms "authentication challenge", "onboarding "challenge" and "identification challenge" may be used interchangeably; and the terms "authenticated status" and "identified status" may be used interchangeably.

Figure 1:
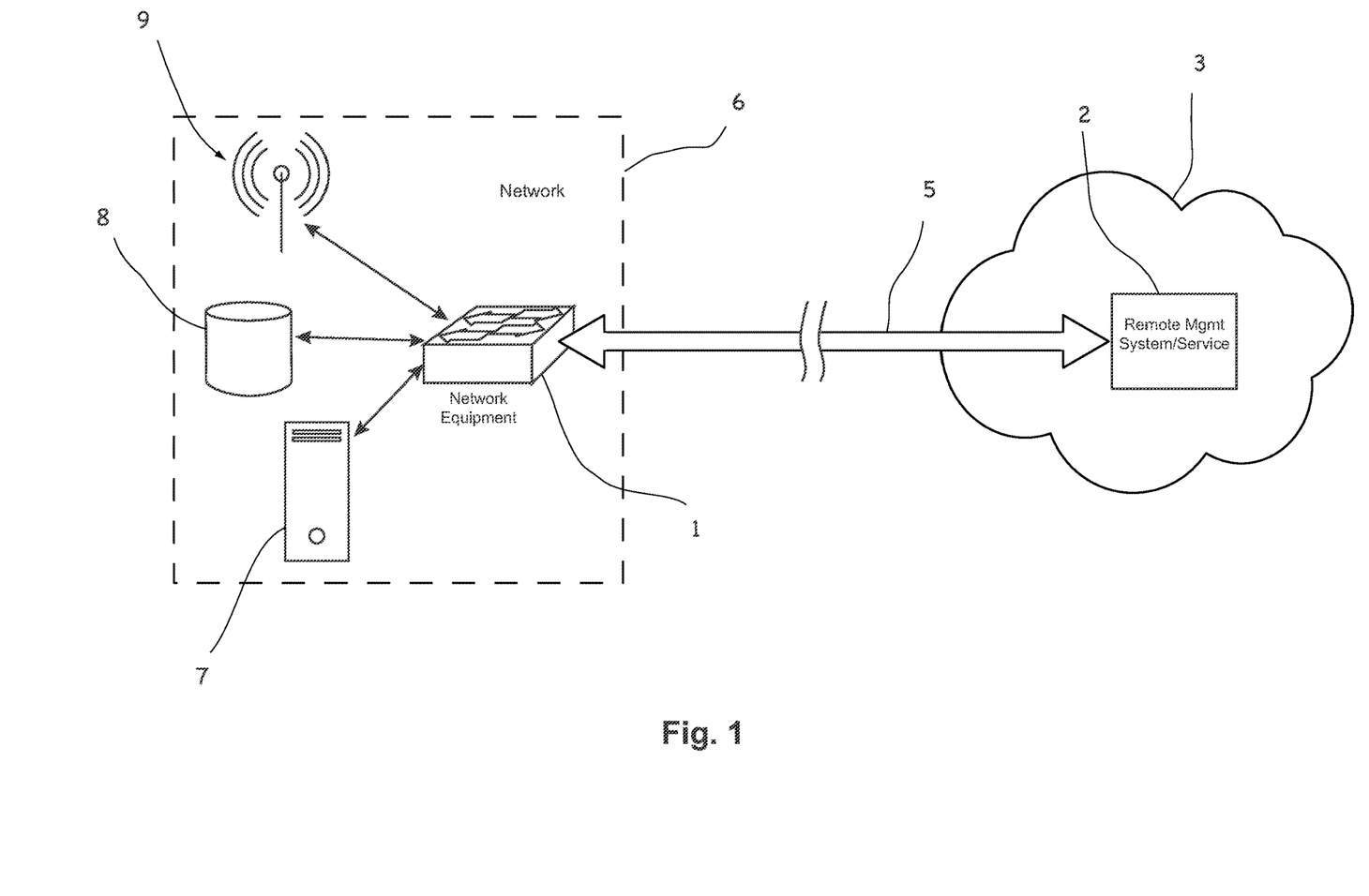
FIG. 1 illustrates an example network arrangement, in which new network equipment may be onboarded in accordance with the present disclosure.

FIG. 1 illustrates an example network arrangement, in which new network equipment may be onboarded in accordance with the present disclosure. Shown in FIG. 1 are a network 6, network equipment 1, local devices 7, 8, 9, and a network management system 2. Each of the elements shown in the example implementation depicted in FIG. 1 may comprise suitable circuitry (including, e.g., general or dedicate processing circuitry, storage circuitry, communication-related circuitry, etc.) that is operable to implement various aspects of the present disclosure.

The arrangement depicted in FIG. 1 may be, in greatly simplified form, a representation of a network management arrangement, such as a software-defined network (SDN) in which the network 6 may be managed by the network management system 2, which may be remote from the network 6. The network 6 may be, for example, a local area network (e.g., in offices of a particular business or company). The network management system 2 may be running remotely, at a remote location 3. For example, network management system 2 may be implemented using one or more servers (each comprising suitable circuitry) at the remote location 3, configured to run hosted network management services. A hosted network management service may be sometimes known as LAN Management as a Service (LANaaS), which may be provided via the internet or other communications network, for example. Thus, the network management system 2 may be implemented as LANaaS system (and may be referred hereafter as LANaaS system 2). In such a remotely-managed SDN system, network intelligence of multiple managed networks (e.g., each being substantially similar to the network 6) may be centralized in one or more software-based SDN controllers (e.g., similar to the network management system 2) which maintain a global view of each managed network, and which may be configured so that the managed networks each appear to applications and policy engines as a single logical entity.

When a new network or sub-network 6 is to be onboarded into the LANaaS system 2, a management service connection 5 may be established between the network equipment 1 (e.g., a switch) of the network 6 and the LANaaS system 2. The network equipment 1 may serve to control network traffic (e.g., to and/or from the local devices 7, 8 and 9), such as with a functionality which is controlled by the remote cloud-based LANaaS system 2.

Figure 2:
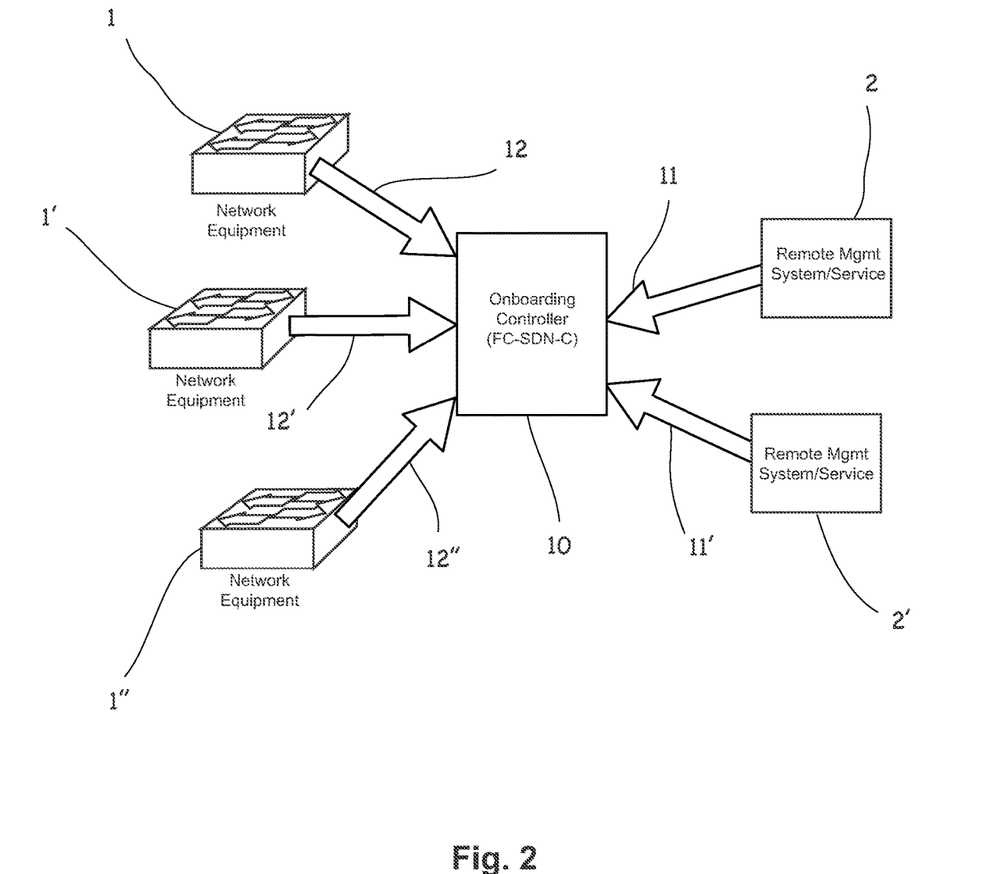
FIG. 2 illustrates an example network arrangement, in which new network equipment may be onboarded in accordance with the present disclosure.

The network-management services may be made available, for example, by an internet service provider (ISP) to a customer who has multiple networks 6 and/or network equipment 1 at multiple locations, and wishes to network them together as though they were all, for example, on the same local area network (LAN), instead of resorting to use of other means for connecting the multiple networks/equipment/locations—e.g., by using multiple virtual private network (VPN) connections to a common server. An example of such arrangement is shown in FIG. 2. A service provider may offer such network management services to multiple customers, each of which may have one or more network equipment elements 1 which are to be connected to their managed network system 2.

Because the LANaaS system 2 may be at a remote location 3, it may not be able to verify directly the identity or the location of the network equipment 1 which is being onboarded. The process of registering the network equipment 1 to the LANaaS system 2 therefore presents a security risk. For example, instead of onboarding network equipment 1, an ill-intentioned intruder may attempt to disguise unauthorized network equipment as the expected network equipment 1, and thereby gain unauthorized access to parts of the managed network 6.

Figure 3:
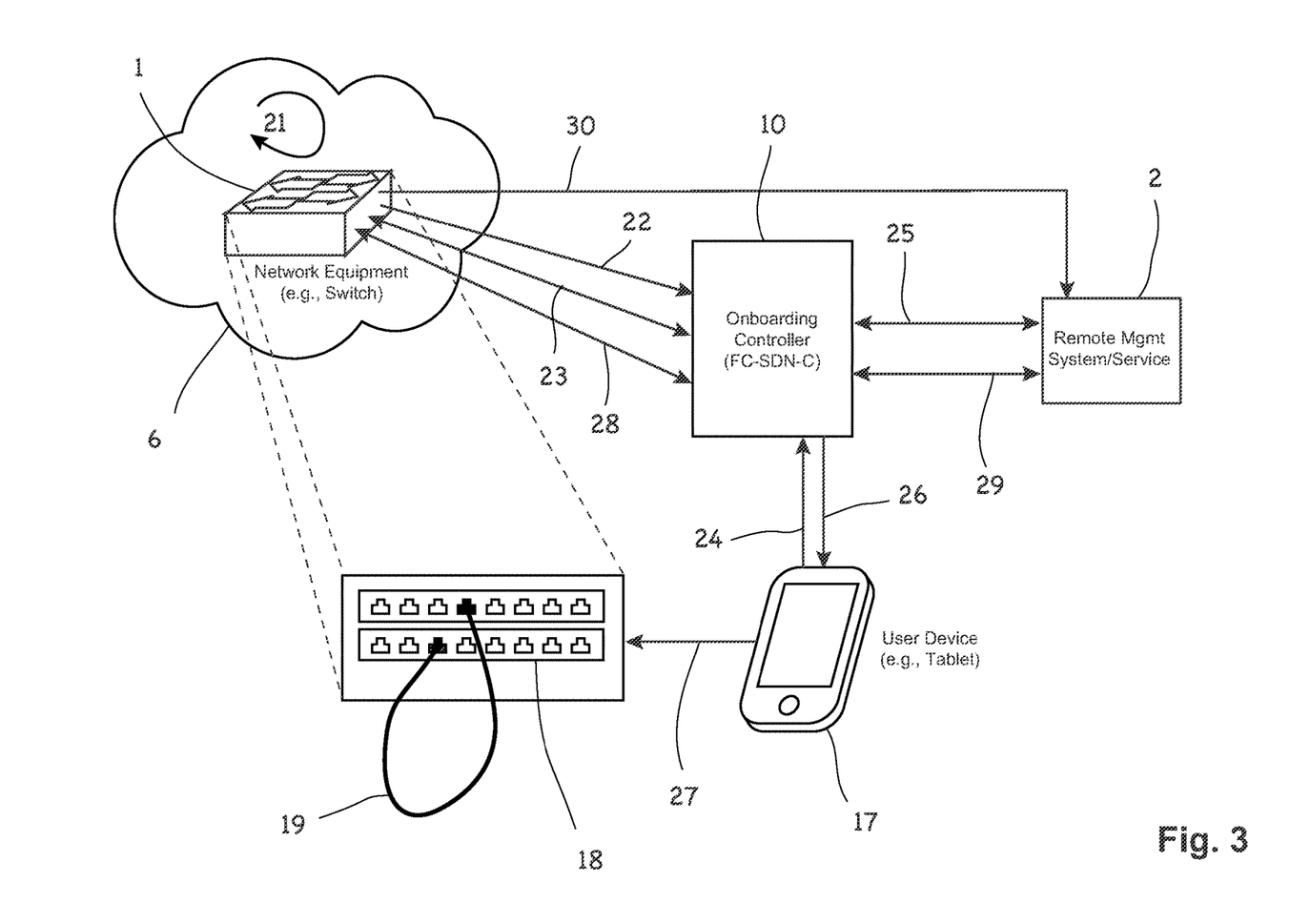
FIG. 3 illustrates an example processing for onboarding new network equipment, in accordance with the present disclosure.

Accordingly, in various implementations in accordance with the present disclosure, an onboarding process in accordance with the present disclosure may be carried out in improved manner, such as by using dedicated onboarding systems (e.g., onboarding controller device) to ensure that new network equipment is identified and onboarded correctly, as described with respect to FIGS. 2 and 3, for example.

FIG. 2 illustrates an example network arrangement, in which new network equipment may be onboarded in accordance with the present disclosure. Shown in FIG. 2 are network equipment elements 1, 1', 1" (multiple instances of the network equipment 1 of FIG. 1), network management systems (or services) 2 and 2' (multiple instances of the network management system 2 of FIG. 1), and an onboarding controller 10.

The onboarding controller 10 may comprise suitable circuitry (e.g., including general or dedicate processing circuitry, storage circuitry, communication-related circuitry, etc.) that is operable to implement various aspects of the present disclosure. The onboarding controller 10 may be operable to control and/or manage at least some of onboarding related operations and/or activities. The onboarding controller 10 may be (and is also referred to hereinafter as) a First Contact SDN Controller (FC-SDN-C).

The example arrangement depicted in FIG. 2 may represent a scenario in which a user, who has multiple networks 6 and/or network equipment 1 at multiple locations, may wish to network them together as though they were all, for example, on the same local area network (LAN). A well-intentioned user should be prevented from onboarding network equipment 1, 1', 1" to the wrong network management system 2, 2'. It is thus important that each new network equipment is added to a particular LANaaS system 2, 2' be authorized to access that system/service (to which it is added).

In an example implementation, the onboarding controller 10 may be used to validate onboarding related activities. For example, the one or more network equipment elements 1, 1', 1" may issue registration requests 12, 12', 12", and network management systems/services 2 and 2' may issue onboarding invitations 11, 11'. The onboarding controller 10 may be operable to validate the requests 12, 12', 12" to the appropriate network management system/service 2 or 2'. The onboarding controller 10 may authenticate network equipment 1, 1', 1" to the network management systems 2, 2' (e.g., to which each equipment is to be onboarded).

The different network management systems 2, 2' may belong to the same provider (or they may serve multiple providers), and they may each be configured to serve multiple customers. During the onboarding process of a new network equipment 1, 1' or 1", therefore, the FC-DSN-C 10 ensures that network equipment 1 of a particular LANaaS customer is onboarded to the correct LANaaS system 2 for that customer's LANaaS network.

Network equipment 1 may be identified with the particular user or administrative entity by a challenge-response method to securely identify which network equipment should be assigned to which LANaaS customer, and/or to verify that the network equipment 1 being onboarded is the network equipment it purports to be.

In an example implementation, identity verification may be based on a configuration "code" which should be manually implemented on the network equipment 1 (for example by a network administrator, using patch cables) and validated by the FC-SDN-C 10. Since different customers receive different identification challenges, the FC-SDN-C can securely assign the network equipment 1 to the corresponding customer. The manual configuration "code" may comprise at least one action which is only capable of being performed by someone who is physically present at the same location as the network equipment to be onboarded.

FIG. 3 illustrates an example processing for onboarding new network equipment, in accordance with the present disclosure. Shown in FIG. 3 are the network equipment 1, network management (LANaaS) system 2, the network 6, the onboarding controller (FC-SDN-C) 10, and a user device 17 (e.g., tablet, laptop, etc.).

Illustrated in FIG. 3 is an example use scenario in which new network equipment (e.g., the network equipment 1, for example a switch) may be onboarded to the appropriate network management system (e.g., LANaaS system 2). In this regard, the network 6 (used by a particular entity—e.g., company) may be managed using a LANaaS system 2, which may be provided by a third-party provider. When the entity associated with the network 6 needs to set up a new location (e.g., new office) having a new local network 6, the user (e.g., company's network administrator) may obtain a new network equipment (e.g., new SDN-capable switch 1), may like to connect the new network equipment it to the existing LANaaS network (for example via the Internet).

This may be done by providing a suitable command/request, such as using available user interface components. For example, the user (network administrator) may log into a web interface of the provider's LANaaS system 2, for example using user device 17. The user may then enter a suitable input—e.g., by selecting a particular corresponding option, such as "connect new switch" function, on the LANaaS provider's web interface. In response, the LANaaS system 2 may send instructions that may inform the user of the configuration or connectivity settings by which the new SDN-capable switch 1 can identify itself to the LANaaS system 2.

The instructions may form part of an identification challenge, by which the LANaaS system 2 may verify which network equipment 1 is the one being onboarded during the registration process (e.g., as selected in the "connect new switch").

According to the instructions in the identification challenge in this example, the user may perform the required setup actions. For example, the user may connect one or more patch cables 19 in a specified pattern between certain specified ports 18 of the SDN-capable switch 1, as shown in FIG. 3. In this regard, reference 18 in FIG. 3 indicates an array of network connection sockets (referred to as ports) of the network equipment 1. The user may connect the patch cable(s) 19 as instructed, and may then return to the web-interface of the device 17 and select the propose follow up input (e.g., "done"), based on which the LANaaS system 2 may identify network equipment (of all the newly-connected network equipment, potentially including some from other network management users of the provider, and/or from other providers) has network ports 18 which are connected in the specified patching pattern, and assigns the identified network equipment 1 to the network management service account of that particular company. Once this onboarding step has been completed, the SDN-enabled switch 1, and the new local network 6, can be integrated into the SDN network managed by the LANaaS system 2 for that particular user by that particular provider. Connecting patch cables 19 between ports 18 on the switch 1 is just one example of how network equipment 1 can be configured for identification to the network management system 2. This is described in more detail below (e.g., with respect to step 26, below).

An example of an onboarding sequence according to the invention is described hereafter in more detail. In this regard, numbering of the sequence steps below corresponds to the same reference numbers shown in FIG. 3.

In step 21, network equipment 1 may be connected to an existing network infrastructure (e.g., the Internet) and may attempt to find the FC-SDN-C 10 of the managed network 6 to which the network equipment 1 is connected. This may be implemented, for example, by: 1) FC-SDN-C 10 queries the network using a dedicated protocol; 2) FC-SDN-C 10 contact information is comprised in the DHCP response of a DHCP server on the network; 3) FC-SDN-C 10 refers to a pre-defined logical contact identifier such as DNS name, IP addresses, MAC address etc.; and/or 4) FC-SDN-C 10 is provided as a global entity on the network, as with DNS, and can be discovered by the LANaaS system 2.

In step 22, the network equipment 1 may attempt to open a connection with logical contact information of FC-SDN-C 10. If necessary, the connection information may be modified, forwarded, or routed by the network to the physical address of the FC-SDN-C 10, which is responsible for onboarding the particular network equipment 1. This may be done, for example, by: 1) data-rewriting, such as application-dependent Network Address Translation; 2) using a globally well-known, dedicated IP address for routing to the local FC-SDN-C; 3) port-based routing (for example using a protocol which uses a well-known port); and/or 4) tunneling.

In step 23, the FC-SDN-C 10 may receive the connection request of the network equipment 1, and may receive data (e.g., metadata) of the network equipment 1. The data may comprise one or more parameters of the network equipment 1, such as, for example: 1) manufacturer/vendor of the network equipment 1; 2) functional capabilities of the network equipment 1; 3) network address(es) of the network equipment 1; 4) network address(es) of other devices 7, 8, 9 connected to the network equipment 1; 5) data path connectivity characteristics of the network equipment 1; and 6) uptime of the network equipment 1.

In step 24, the user may contact the FC-SDN-C 10, such as to inform it that the network equipment 1 to be onboarded into the network 6 is available. The user may do this through a web interface on a portable device 17, for example. The FC-SDN-C 10 may use information provided by the user (e.g., what other network equipment should be reachable, network address of the network equipment 1, available bandwidth to the network equipment 1, number of ports of the network equipment 1, identity of the network operator/provider, geolocation, etc.) to reduce the number of potential candidate network equipment (e.g., from equipment elements 1, 1', 1"). The LANaaS system 2 may query the FC-SDN-C 10 for details of candidate network equipment devices and/or to ensure that it is the correct network equipment 1 which is being onboarded.

In some instances, it may be possible for the user simply to accept the network equipment 1 based on the information which the LANaaS system 2 received from the network equipment 1 (e.g., the IP address of the network equipment 1), and then to proceed with step 29. However, since such information may not be reliable (e.g., may be faked by attackers), a challenge-response identification procedure may be performed, such as, for example, described with respect to the following steps 25 to 28.

In step 25, the LANaaS system 2 may request an identification challenge from the FC-SDN-C 10, optionally including some data (e.g., metadata) with the request, and may send the received identification challenge over a secure channel to the user (e.g., via a web interface, or a mobile phone service, such as SMS).

In step 26, the user may receive instructions or configuration information comprised in the identification challenge from the FC-SDN-C 10. The user may, for example, receive this information via a web-page on the user device 17. The identification challenge may comprise, for example: 1) geographic location of the network equipment 1 (e.g., GPS, Geolocation information); 2) one or more pairs of ports of the network equipment which should be patched together; 3) one or more connection ports 18 of the network equipment 1 which should be patched to another, independently verifiable network device (the other network device may already be registered to the LANaaS system 2); 4) one or more connection ports 18 which should be connected to the Internet; 5) sequence information for performing the identifying action(s) (e.g., first patch Port A to Port X, then Port B to Port Y, etc.); and/or 6) time constraint information for performing the identifying action(s) (e.g., patch Port A to Port X in a time-window which begins after thirty seconds and finishes after forty seconds).

In step 27, the user may make the manual configuration changes to the network equipment 1 according to the instructions and/or configuration information in the identification challenge. For example, the user may connect a patch cable 19 between two network ports 18 specified in the identification challenge as indicated in FIG. 3. The user may then notify the FC-SDN-C 10 (e.g., by clicking an appropriate link in a web interface on the user device 17) that the instructions of the identification challenge have been carried out.

In step 28, in response to the notification from the user, or in response to a different stimulus such as a result of a change detected by regular, repeated or continuous monitoring of the connected network equipment 1, the FC-SDN-C 10 may detect that the network equipment 1 has been configured (e.g., patched) according to the identification challenges. The validation of the implemented pattern may be carried out using one or more of the following actions (or any other suitable actions): 1) the FC-SDN-C 10 may evaluate connectivity of the interconnected ports of the network equipment 1 by injecting traffic on to one or more appropriate interface(s) and observing on which interface(s) a response is detected, and/or whether the detected response matches a predetermined expected response; 2) the FC-SDN-C 10 may create packet traffic on a second device which should, according to the identification challenge, be connected to the network equipment 1, and evaluates on which ports 18, if any, the traffic arrives at or emanates the network equipment 1; 3) the FC-SDN-C 10 may determine the sequence and/or timing of the ports 18 becoming active; and/or 4) the FC-SDN-C 10 may determine which network addresses and/or services are reachable from the network equipment 1, and compares these against one or more predetermined expected network addresses and/or services. In some instances, the user may have multiple managed networks, and as such a determination may be made as to which of the managed networks the network equipment is being onboarded (which may also be pertinent in determining the corresponding LANaaS system).

In step 29, the LANaaS system 2 may be informed by the FC-SDN-C 10 whether or not the instructions specified in the identification challenge have been correctly (or within a predetermined tolerance) implemented in the network equipment 1, and may include, where appropriate, any relevant information as described above. The LANaaS management system 2 may inform the FC-SDN-C 10 of the network contact point information at which the network equipment 1 can join the appropriate managed network, and the FC-SDN-C 10 may forward this contact information to the network equipment 1. If no network equipment was uniquely identified during the above steps, the identification process may then be repeated (e.g., by returning to step 24 and repeating from them), and this "retrying" status may be indicated to the user on the web interface, for example. A "Burn-Out" constraint may also be added in such a system; after each unsuccessful onboarding attempt, a waiting period may be included as a precaution against denial-of-service or brute force attacks.

In step 30, the FC-SDN-C 10 may associate the network equipment 1 with the particular LANaaS system 2 which is responsible for managing the particular managed network, and updates the user's view of the managed network so that the newly-onboarded network equipment 1 is included in the managed network's topology.

It should be understood that the patched connections 19 described above are just one possible way of manually configuring the network equipment 1 such that the onboarding controller (FC-SDN-C) 10 may verify its identity. In other implementations, other approaches may be used, such as, for example, connecting one or more of the connection ports 18 of the network equipment 1 to another local device (not shown) at the same location, which is also remotely verifiable (or already verified) by the onboarding controller 10, or connecting one or more of the connection ports 18 of the network equipment 1 to the Internet (e.g., via a device with an already-verified IP address). Further, while the examples given here may describe the use of physical (wired) connectors/connections, it is possible to use local wireless connections, or a combination of wired and local wireless connections. A local wireless connection may comprise Bluetooth, for example, or wireless LAN, or near-field communication, electromagnetic or a line-of-sight optical communication link.

Other manual configuration actions are also possible, depending on what manually-configurable features are available in the particular network equipment 1. If the network equipment 1 comprises manually-operable switches or jumpers, for example, then these may be used to compose the manual configuration "code" which is used by the onboarding controller (FC-SDN-C) 10 to determine the identity of the network equipment 1. The particular manually-configurable features of the network equipment 1 may be taken into account by the onboarding controller (FC-SDN-C) 10 when generating the challenge information, so that the challenge information includes manual configuration changes of one or more of the particular manually-configurable features available at the network equipment 1.

In an example implementation, the onboarding controller (e.g., the FC-SDN-C 10) may actively determine that the configuration changes instructed or requested in challenges to the network equipment (e.g., the network equipment 1) are made. For example, the onboarding controller may transmit one or more test signals to the network equipment, and may then determine whether (or not) the configuration changes are made based on reception of one or more corresponding test response signals from the network equipment.

In an example implementation, multiple (different) networks may be used in the communications between the onboarding controller (e.g., the FC-SDN-C 10) and the network equipment (e.g., the network equipment 1). For example, the onboarding controller may communicate with the network equipment via a first network and a second network, which is different than the first network. Some of the communications (e.g., an onboarding request) may then be made via the first network, while other communications (e.g., challenges and/or related information) are made via the second network.

In an example implementation, the challenges issued by the onboarding controller (e.g., the FC-SDN-C 10) to the network equipment (e.g., the network equipment 1) may comprise multiple configuration changes. For example, the configuration change may comprise a sequence of separate changes (e.g., at least a first and a second configuration change), which may need to be handled and/or applied separately. The sequence may be configured such that there may be particular timed interval between each two consecutive changes (e.g., between the first and second configuration changes).

Other embodiments of the disclosure may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein.

Accordingly, the present disclosure may be realized in hardware, software, or a combination of hardware and software. The present disclosure may be realized in a centralized fashion in at least one computer system, or in a distributed fashion where different units are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present disclosure may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present disclosure makes reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present disclosure not be limited to the particular embodiment disclosed, but that the present disclosure will include all embodiments falling within the scope of the appended claims.

What is claimed is:

1. A method comprising:
in an onboarding controller of a managed network:
receiving an onboarding request communicated from network equipment to be onboarded into the managed network, wherein the onboarding request is communicated via the managed network;
generating a challenge for the network equipment;
sending the challenge to a user device of a user associated with the network equipment, wherein:
the challenge is sent to the user device over a secure connection that is different than and is used concurrently with a connection used in communicating the onboarding request;
the challenge comprises instruction information of a configuration change to be made to the network equipment;
the configuration change comprises a sequence of at least a first and a second configuration change of the network equipment; and
the sequence comprises a timed interval between the first and second configuration changes of the network equipment;
detecting the configuration change;
verifying based on detecting of the configuration change, an identity and/or a network location of the network equipment; and
onboarding the network equipment onto a particular remote management system based on the verification of the identity and/or the network location of the network equipment.

2. The method of claim 1, comprising:
determining that the configuration change is made to the network equipment; and
selectively onboarding the network equipment to the managed network, based on outcome of the made configuration change.

3. The method of claim 2, wherein:
the managed network is one of a plurality of managed networks; and
the selective onboarding comprises selecting to which of the plurality of managed networks to onboard the network equipment.

4. The method of claim 2, wherein determining that the configuration change is made comprises:
transmitting one or more test signals to the network equipment; and
receiving one or more test response signals from the network equipment.

5. The method of claim 1, wherein the configuration change comprises configuring one or more connections to and/or within the network equipment.

6. The method of claim 5, wherein the one or more connections comprise at least one local connection to a network device local to and different from the network equipment.

7. The method of claim 5, wherein the one or more connections comprise at least one local connection between two different ports of the network equipment.

8. The method of claim 1, comprising communicating with the network equipment via a first network and a second network that is different than the first network, wherein
the onboarding request is received via the first network, and
the challenge and/or information related to the challenge is communicated via the second network.

9. The method of claim 1, wherein application of the configuration change requires that at least one action be performed manually at the network equipment by the user associated with the network equipment.

10. A system comprising:
an onboarding controller for onboarding network equipment to a managed network, the onboarding controller comprises at least a processing circuit and a communication circuit, wherein:
the communication circuit is operable to receive an onboarding request communicated from network equipment to be onboarded into the managed network, wherein the onboarding request is communicated via the managed network;
the processing circuit is operable to generate a challenge for the network equipment, wherein:
the challenge comprises instruction information of a configuration change to be made to the network equipment;
the configuration change comprises a sequence of at least a first and a second configuration change of the network equipment; and
the sequence comprises a timed interval between the first and second configuration changes of the network equipment;
the communication circuit is operable to send the challenge to a user device of a user associated with the network equipment, wherein the challenge is communicated to the user device over a secure connection that is different than and is used concurrently with a connection used in communicating the onboarding request; and
the onboarding controller is operable to:
detect the configuration change;
verify based on detecting of the configuration change, and identity and/or a network location of the network equipment; and onboard the network equipment onto a particular remote management system based on the verification of the identity of the network equipment and/or the network location of the network equipment.

11. The system of claim 10, wherein the onboarding controller is operable to:
determine that the configuration change is made to the network equipment; and
selectively onboard the network equipment to the managed network, based on outcome of the made configuration change.

12. The system of claim 11, wherein:
the managed network is one of a plurality of managed networks; and
the selective onboarding comprises selecting to which of the plurality of managed networks to onboard the network equipment.

13. The system of claim 11, wherein determining that the configuration change is made comprises:
transmitting one or more test signals to the network equipment; and
receiving one or more test response signals from the network equipment.

14. The system of claim 10, wherein the configuration change comprises configuring one or more connections to and/or within the network equipment.

15. The system of claim 14, wherein the one or more connections comprise at least one local connection to a network device local to and different from the network equipment.

16. The system of claim 14, wherein the one or more connections comprise at least one local connection between two different ports of the network equipment.

17. The system of claim 10, wherein the onboarding controller is operable to communicate with the network equipment via a first network and a second network that is different than the first network, wherein:
the onboarding request is received via the first network, and
the challenge and/or information related to the challenge is communicated via the second network.

18. The system of claim 10, wherein:
application of the configuration change requires that at least one action be performed manually at the network equipment by the user associated with the network equipment; and
the onboarding controller is operable to detect the configuration change based on a determination that the user performed the at least one action.

* * * * *